United States Patent
Facchinello et al.

(10) Patent No.: US 9,764,628 B2
(45) Date of Patent: *Sep. 19, 2017

(54) TONNEAU COVER SYSTEM AND SIDE LOCK CLAMP

(71) Applicant: Extang Corporation, Ann Arbor, MI (US)

(72) Inventors: Jerome J. Facchinello, Grand Blanc, MI (US); Charles A. Fabros, Downers Grove, IL (US); Brian P. Kozlowski, Canton, MI (US)

(73) Assignee: Extang Corporation, Ann Arbor, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/355,339

(22) Filed: Nov. 18, 2016

(65) Prior Publication Data

US 2017/0066311 A1    Mar. 9, 2017

Related U.S. Application Data

(63) Continuation-in-part of application No. 14/874,795, filed on Oct. 5, 2015, now Pat. No. 9,533,555.

(60) Provisional application No. 62/323,017, filed on Apr. 15, 2016, provisional application No. 62/060,637, filed on Oct. 7, 2014.

(51) Int. Cl.
| | |
|---|---|
| B65D 45/00 | (2006.01) |
| B60J 7/19 | (2006.01) |
| B60J 7/14 | (2006.01) |
| F16B 2/12 | (2006.01) |
| B60J 7/10 | (2006.01) |

(52) U.S. Cl.
CPC .............. *B60J 7/198* (2013.01); *B60J 7/141* (2013.01); *F16B 2/12* (2013.01); *B60J 7/102* (2013.01)

(58) Field of Classification Search
CPC .......... B60J 7/198; B65D 45/00; B65D 45/04; B65D 45/10; B65D 45/16; B65D 45/24; B65D 45/322; E05C 19/18; E05C 19/182; E05C 19/184; E05C 19/186; E05C 19/188
USPC ...... 292/256, 258, 288; 296/100.02, 100.07; 248/220.21, 220.22, 221.11, 222.11, 248/222.13, 222.14, 222.52
See application file for complete search history.

(56) References Cited

U.S. PATENT DOCUMENTS

| | | |
|---|---|---|
| 5,540,475 A | 7/1996 | Kersting et al. |
| 5,655,808 A | 8/1997 | Wheatley |
| 7,258,387 B2 | 8/2007 | Weldy |

(Continued)

*Primary Examiner* — Matthew Ing
(74) *Attorney, Agent, or Firm* — Harness, Dickey & Pierce, P.L.C.

(57) ABSTRACT

A clamp to secure a tonneau cover to a frame of a cargo box includes a first clamp member coupled that has a first clamping surface. A second clamp member that has a second clamping surface. A ramp mechanism that causes lateral translation of the second clamping surface toward the first clamping surface, as the clamp moves between clamped and unclamped positions. A cam lock member positioned to engage with the second clamp member and includes a lever for placing the cam lock member in locked or unlocked states. When the cam lock member moves from the unlocked state to the locked state, the second clamp member moves toward the tonneau cover to the clamped position. When the cam lock member moves from the locked state to the unlocked state, the second clamp member moves away from the tonneau cover to the unclamped position.

15 Claims, 13 Drawing Sheets

(56) References Cited

U.S. PATENT DOCUMENTS 7,628,442 B1 12/2009 Spencer et al.
8,807,625 B2 8/2014 Garska

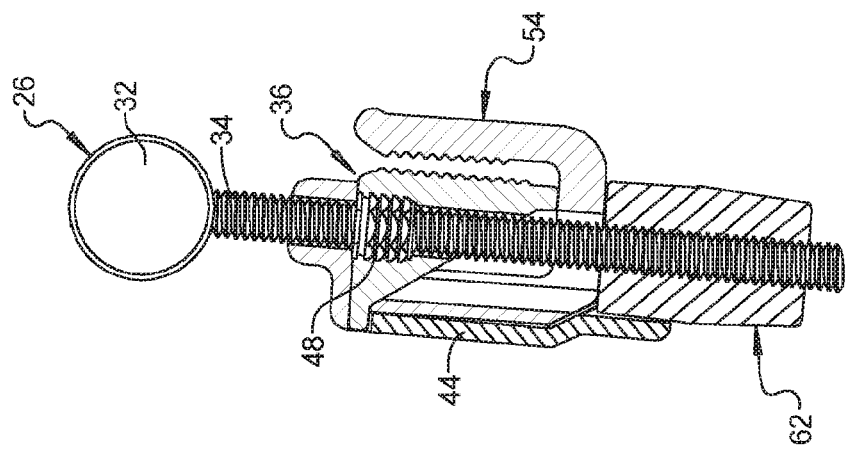
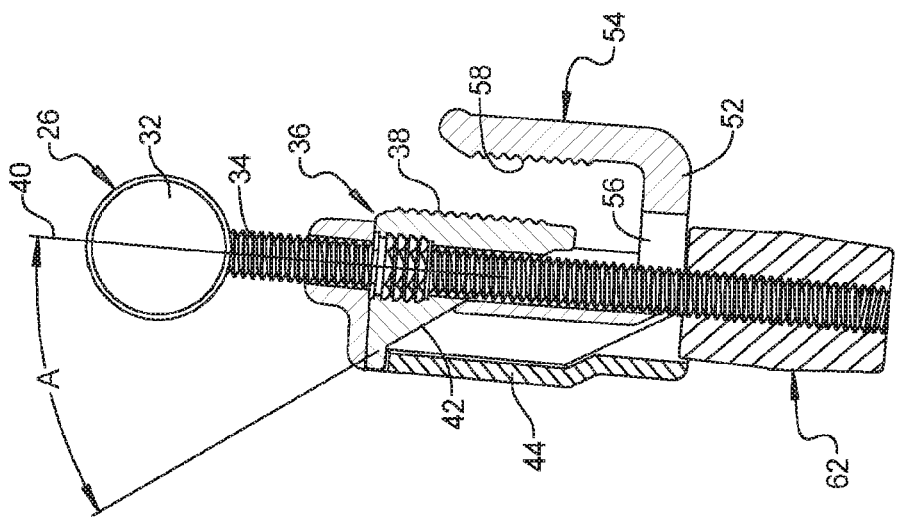
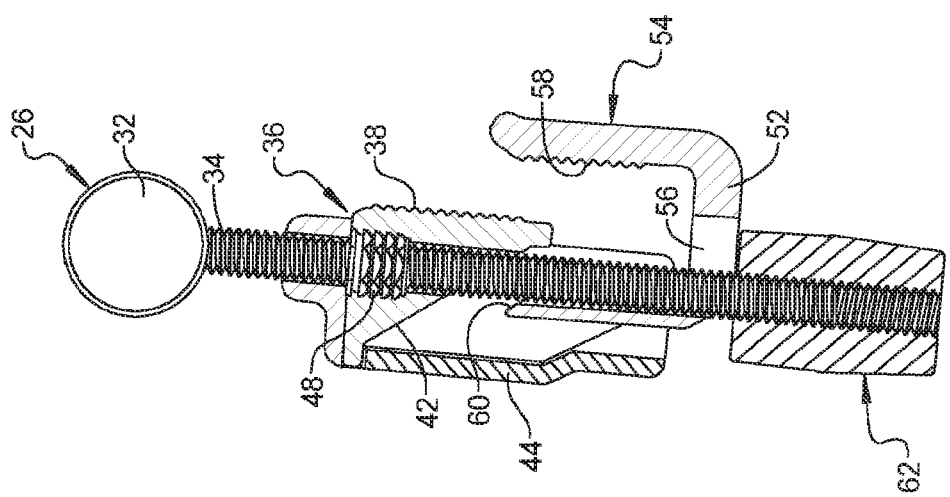

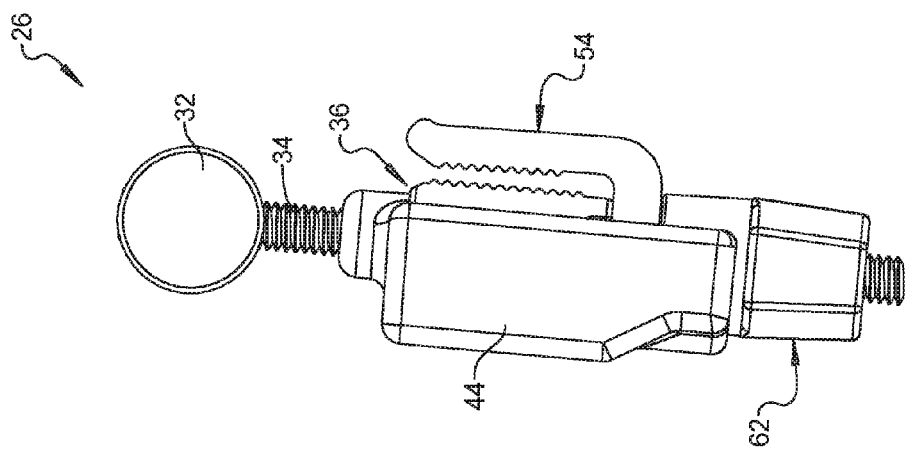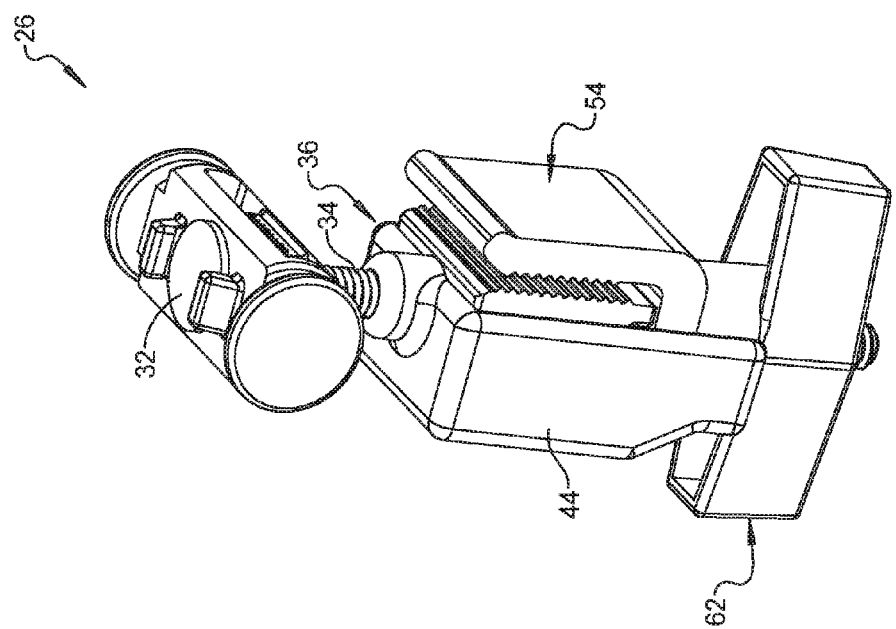

_US 9,764,628 B2_

TONNEAU COVER SYSTEM AND SIDE LOCK CLAMP

CROSS-REFERENCE TO RELATED APPLICATIONS

This application claims the benefit of U.S. Provisional Application No. 62/323,017, filed on Apr. 15, 2016. This application is a continuation-in-part of U.S. patent application Ser. No. 14/874,795, filed on Oct. 5, 2015, which claims the benefit of U.S. Provisional Application No. 62/060,637, filed on Oct. 7, 2014. The entire disclosures of the above applications are incorporated herein by reference.

FIELD

The present disclosure relates to tonneau covers for vehicles. More particularly, the present disclosure relates to a clamp system for use in a tonneau cover system.

BACKGROUND

This section provides background information related to the present disclosure which is not necessarily prior art.

Tonneau covers have been used for a number of years to cover the cargo box of pickup trucks to block dirt, debris, and other environmental contaminants and to improve the aesthetic quality thereof. Originally, tonneau covers were designed by upholstery shops and typically made of vinyl covered fabrics or canvas. The material was often doubled over along its edges for added strength and appearance. Male snaps were then attached to the sides of the cargo box of the pickup truck via fasteners, while female snaps were attached along the edges of the cover. Wooden bows were sometimes used to span the cargo box and ensure that the cover remained high enough to drain water. Unfortunately, these covers were sometimes difficult to handle and/or manufacture, and occasionally failed to protect the cargo box.

More recently, foldable tonneau covers are often more desirable in that they conveniently cover the bed of the pickup truck for cargo protection. However, when not in use, the foldable tonneau cover may be folded toward the rear of the passenger cabin (or other location). Generally, foldable tonneau covers include a frame network of cross bows, a tarp or covering operably coupled to and spanning the frame network, a latching or clamp system for coupling the frame network to the pickup truck and a means for stowing the clamp system, and a hinge system for hingedly coupling adjacent sections of the foldable tonneau cover. However, the known prior art fails to maximize the ease and effectiveness of foldable tonneau covers and, thus, many foldable tonneau covers suffer from numerous disadvantages.

By way of example, existing clamp systems generally employ an over-center cam lock arrangement, wing nut clamp arrangement, and/or spring biased clamp arrangement to fasten the tonneau cover in place relative to the pickup truck. The clamps typically hook onto the downwardly projecting (metal) flange of the truck bed. Such clamps, in the case of the cam lock arrangement, are adjustable by rotating a threaded cam pivot to permit attachment of the clamps to pickup trucks with downwardly projecting flanges of differing lengths. The other clamping systems can use threaded portions or other telescoping type mechanisms to provide a length adjustment feature.

However, these clamping systems lead to various problems or failures when used with more recent pickup truck bed designs produced by original equipment manufacturers (OEM). For instance, many of the newer sidewall flanges of pickup truck beds can become deformed under the extreme load that can be exerted by clamping systems. In fact, several new vehicles being designed are contemplating changes to the flange material or reducing the flange thickness. The result is a less structural flange which could be distorted when using typical tonneau clamp designs clamped to such downwardly extending flanges of the truck bed box. Consequently, as a conventional tonneau cover clamp is tightened in place, a user can exert sufficient force that causes the sidewall flange of the pickup truck bed to become permanently deformed.

Accordingly, there exists a need in the relevant art to provide a tonneau cover system capable of overcoming the disadvantages of the prior art. Additionally, there exists a need to provide sufficient retention capability to retain the tonneau cover on the pickup truck bed, without causing permanent deformation.

SUMMARY

This section provides a general summary of the disclosure, and is not a comprehensive disclosure of its full scope or all of its features.

In accordance with an aspect of the present disclosure, a tonneau cover system for a cargo box, including a frame, of a pickup truck can include a tonneau cover for covering the cargo box. A clamp to secure the tonneau cover to the frame can include a first clamp member, a second clamp member, a ramp mechanism, and a cam lock member. The first clamp member can be coupled to the tonneau cover and can have a first clamping surface. The second clamp member can be coupled to the tonneau cover and can have a second clamping surface. The second clamp member can be moveable relative to the first clamp member between an unclamped position and a clamped position. The ramp mechanism can include at least one ramp surface between the first and second clamp members shaped to cause lateral translation of the second clamping surface toward the first clamping surface in response to movement of the second clamp member toward the tonneau cover as the clamp moves from the unclamped position to the clamped position. The cam lock member can be positioned to engage with the second clamp member and can include a lever for placing the cam lock member in a locked state or an unlocked state. The cam lock member can cause the second clamp member to move toward the tonneau cover as the cam lock member moves from the unlocked state to the locked state and can cause the second clamp member to move away from the tonneau cover as the cam lock member moves from the locked state to the unlocked state.

Further areas of applicability will become apparent from the description provided herein. The description and specific examples in this summary are intended for purposes of illustration only, and are not intended to limit the scope of the present disclosure.

DRAWINGS

The drawings described herein are for illustrative purposes only of selected embodiments and not all possible implementations, and are not intended to limit the scope of the present disclosure.

FIG. 4A is a cross-sectional view of the side lock clamp of FIG. 2 in an unclamped position.

FIG. 4B is a cross-sectional view of the side lock clamp of FIG. 4A in an intermediate unclamped position.

FIG. 4C is a cross-sectional view of the side lock clamp of FIG. 4A in a clamped position.

FIG. 5 is a perspective view of the side lock clamp of FIG. 2 in a clamped position.

FIG. 6 is a side plan view of the side lock clamp of FIG. 2 in a clamped position.

Corresponding reference numerals indicate corresponding parts throughout the several views of the drawings.

DETAILED DESCRIPTION

Figure 1:
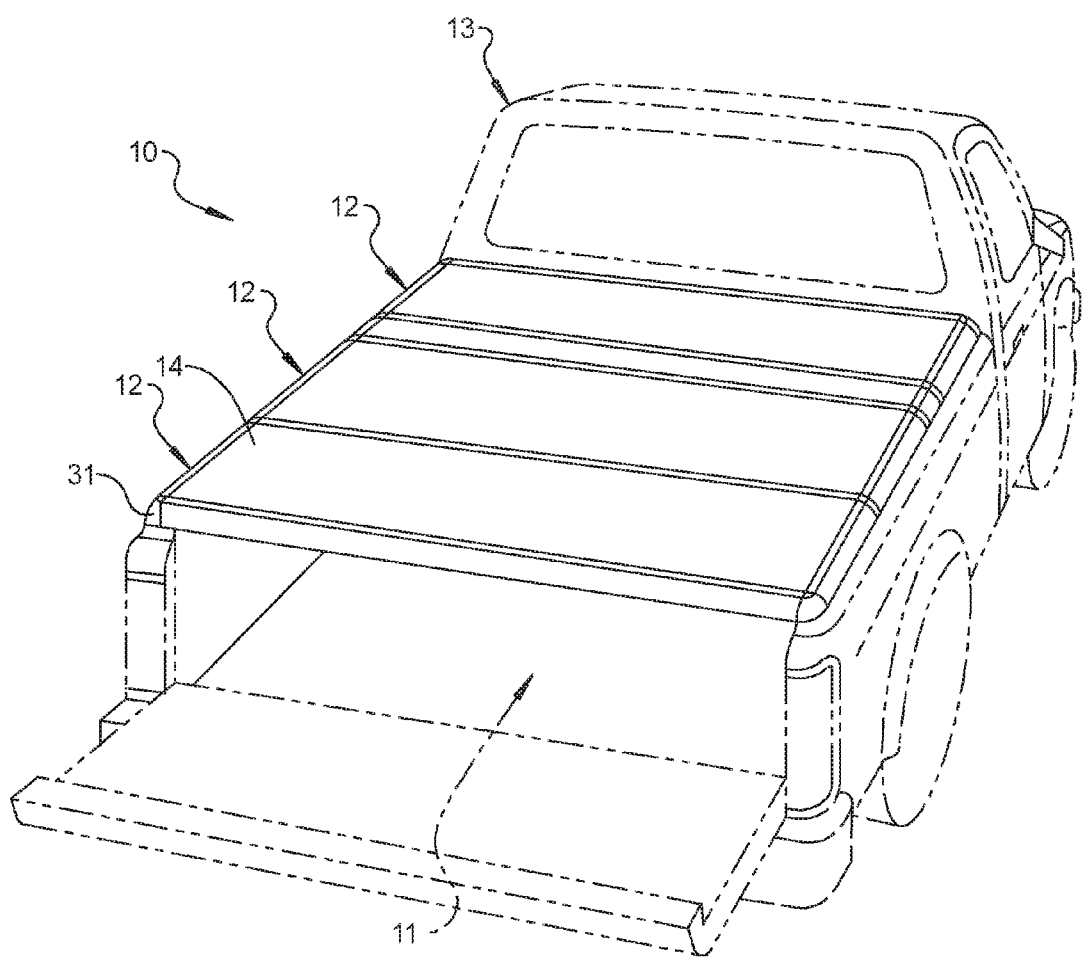
FIG. 1 is a perspective view of one exemplary embodiment of a tonneau cover system with a side lock clamp in accordance with the present disclosure.

Example embodiments will now be described more fully with reference to the accompanying drawings.

FIGS. 1-7 illustrate one exemplary tonneau cover system 10 for covering a truck bed or cargo box 11 in accordance with the present disclosure. In some cases, the truck bed or cargo box 11 can be part of a pickup truck 13 as shown. The cargo box 11 includes a frame that can have an outer wall 16, a ledge 18 extending inboard from the outer wall 16, and a flange 20 extending downwardly from the ledge 18 and spaced inboard from the outer wall 16. The flange 20 includes an outboard face or side 22 facing the outer wall 16 and an inboard face or side 24 opposite the outboard side 22.

In some embodiments, the tonneau cover system 10 can include a plurality of sections 12 foldable between a deployed arrangement covering the truck bed 11 and a folded arrangement wherein the sections 12 are stacked, allowing access to the truck bed 11. In some embodiments, each section 12 of the tonneau cover system 10 can comprise a plurality of frame and/or bow members 31 that together form a rectangular frame supporting a fabric, textile, or other flexible sheet material 14 spanning the rectangular frame 31. In some embodiments, each of the plurality of tonneau sections 12 can alternatively comprise a generally rigid panel as the spanning material 14, and which can optionally include frame members 31 around the periphery of the rigid panel 14 that can similarly form the rectangular frame 31. The sections 12, the frame members 31, and the material 14 can be considered a tonneau cover. Other tonneau cover configurations are, of course, possible.

The tonneau cover system 10 can include a side lock clamp 26 pivotably coupled to one of the frame members 31. For example, the frame member 31 can comprise an extruded metal rail having a C-shaped cross-section defining a longitudinal internal channel 28 with a longitudinally extending central opening 30. A barrel member 32 can be rotatably and slidably retained within the channel 28. The clamp 26 can include a rod 34 that can be threadably coupled to the barrel member 32. The rod 34 can extend out of the channel 28 through the opening 30 to pivotably couple the clamp 26 to the frame member 31.

A first clamp member 36 can be threadably coupled to the rod 34 via threaded insert 48. The first clamp member 36 can include a first clamping surface 38 that can extend generally parallel to the longitudinal or central axis 40 of the rod 34. The first clamping surface 38 can be disposed to engage the inboard side 24 of the flange 20. The first clamp member 36 can also include a first ramp surface 42 extending at an acute angle A relative to the axis 40 of the rod 34. In some embodiments, the first clamp member 36 can additionally be integrated with a housing portion 44 defining an interior cavity 46. As illustrated, the housing portion 44 can be a separate component of the first clamp member 36. Alternatively, a single piece component can provide any combination or all of the housing portion 44, the ramp surface 42, and the first clamping surface 38 of the first clamp member 36.

In the illustrated embodiment, it should be apparent that the housing portion 44 component is integrated with the other component portion of the first clamp member 36 in the sense that they move together along the axis 40 of the rod 34. As noted above, the first clamp member 36 can be rotated clockwise or counter-clockwise on the post 34 so that threads of the post 34 and of the insert 48 of the first clamp member 36 cooperate to adjust the first clamp member 36 upwardly toward or downwardly away from the barrel 32 or tonneau cover by turning on the bolt. In some cases, the clamp 26 can be positioned to be as high as possible when in the clamped position (e.g., FIG. 3) without a base 52 of the clamp 26 touching the bottom or distal edge 50 of the flange 20.

A second clamp member 54 can be mounted on the rod 34 via an aperture 56 such that the second clamp member 54 can be slidably coupled to the rod 34. The second clamp member 54 can include a second clamping surface 58 that can extend substantially parallel to the first clamping surface 38. The second clamp member 54 can include a second ramp surface 60 extending at a complementary angle to the acute angle A and disposed to engage against the first ramp surface 42. The second clamp member 54 can be axially moveable relative to the first clamp member 36 along the rod 34. In response to this axial movement, the second ramp surface 60 of the second clamp member 54 can also move along the first ramp surface 42 of the first clamp member 36 which can cause translation of the second clamp member 54 relative to and toward the first clamp member 36 and in a direction that is perpendicular to the axis A as the second clamp member 54 moves from an unclamped position to a clamped position relative to the first clamp member 36.

The side lock clamp 26 can further include a manually rotatable threaded connector or wing nut 62. This manually rotatable threaded connector 62 can be threaded onto the rod 34, where it can engage the second clamp member 54. Thus, manual clockwise rotation of the threaded connector 62 can cause the axial movement of the second clamp member 54 along the rod 34, and the resulting perpendicular movement driven by the sliding contact of the first ramp surface 42 and the second ramp surface 60 as the clamp moves from its unclamped position to its clamped position. Of course, alternative cooperating coupling and driving members, beyond the illustrated cooperating threads, can be provided on the rod 34 and the connector 62 to enable engagement of the ramp surfaces 42 and 60 via movement under influence of a driving member 62 of the second clamp member 54 relative to the first clamp member 36.

FIG. 4A illustrates one embodiment of the clamp 26 in an unclamped position. In this unclamped position, the second ramp surface 60 of the second clamp member 54 is axially spaced from the first ramp surface 42 of the first clamp member 36. In other words, there is a gap or space between the first and second ramp surfaces 42 and 60, respectively. FIG. 4A illustrates another unclamped position in which the second ramp surface 60 of the second clamp member 54 have just initially contacted each other, eliminating the gap or space therebetween. Thus, the second clamp member 54 has moved relative to the first clamp member 36 in a purely axial direction of the rod 34 from FIG. 4A to FIG. 4B. In other words, the second clamp member 54 has not undergone any lateral or perpendicular translation or movement relative to the axis 40 of the rod 34, or relative to the first clamp member 36.

In contrast, FIG. 4C illustrates one embodiment of the clamp 26 in a clamped position. In moving from the unclamped position illustrated in FIG. 4B to the clamped position illustrated in FIG. 4C, continued clockwise rotation of the threaded connector 62 continues the axial movement, resulting in the second ramp surface 60 of the second clamp member 54 moving along the first ramp surface 42 of the first clamp member 36 causing translation of the second clamp member 54 relative to and toward the first clamp member 36 and in a direction that is perpendicular to the axis A of the rod 34. Thus, the second clamp member 54 has moved relative to the first clamp member 36 in both an axial direction and a direction perpendicular thereto from FIG. 4B to FIG. 4C. In other words, the second clamp member 54 has undergone both axial and lateral or perpendicular translation or movement relative to the axis 40 of the rod 34, or relative to the first clamp member 36.

Figure 3:
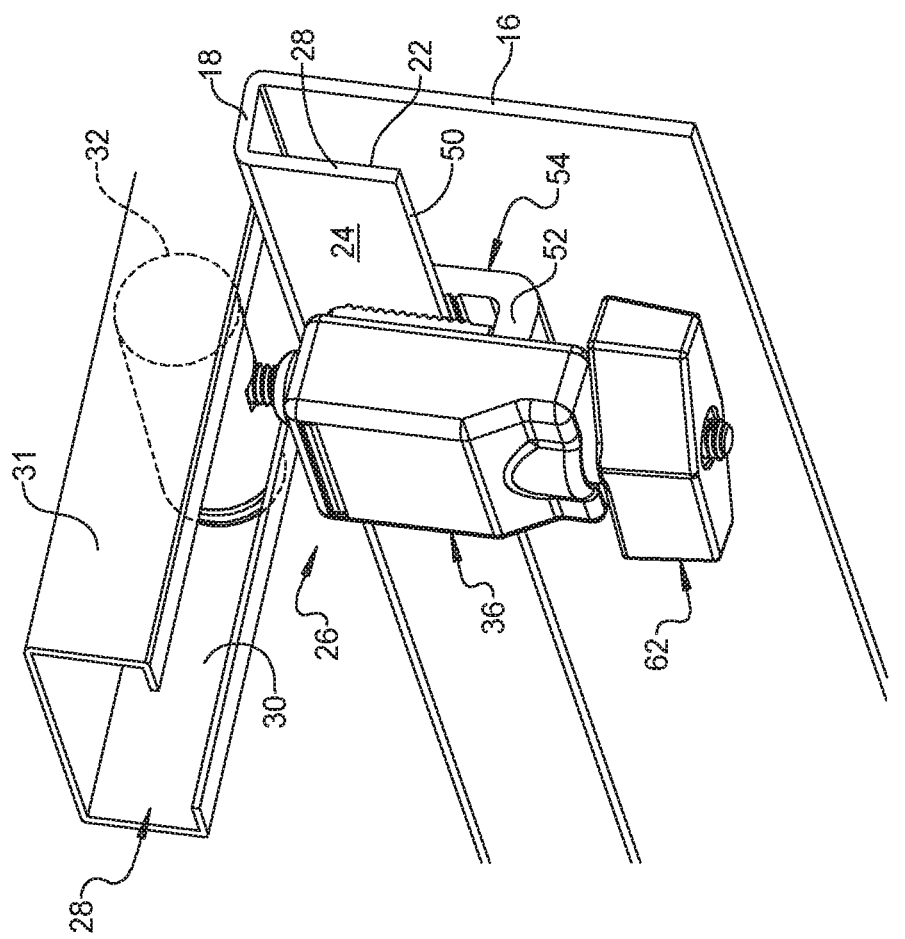
FIG. 3 is a partial perspective view of components of the tonneau cover system with side lock clamp of FIG. 2 in a clamped position, with a portion of the cargo box.
Figure 2:
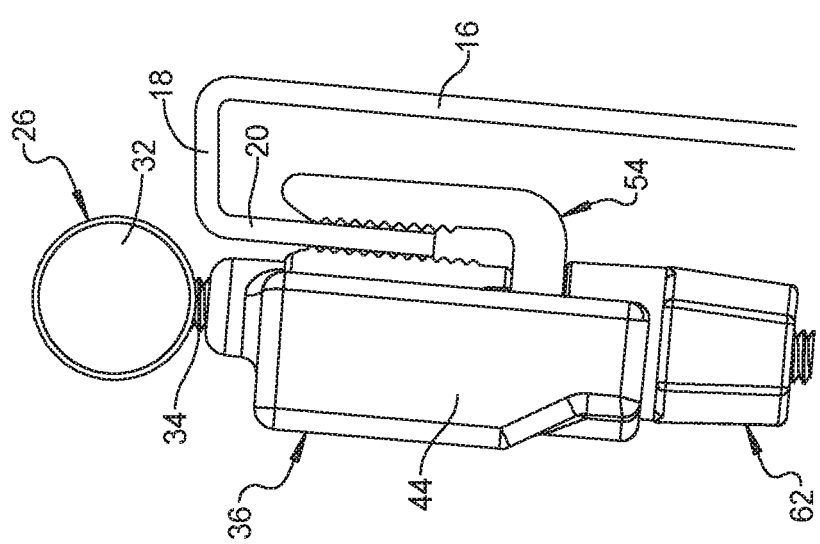
FIG. 2 is a side plan view of one exemplary embodiment of a side lock clamp of the tonneau cover system of FIG. 1 in a clamped position, with a partial cross-sectional view of a cargo box.
Figure 7:
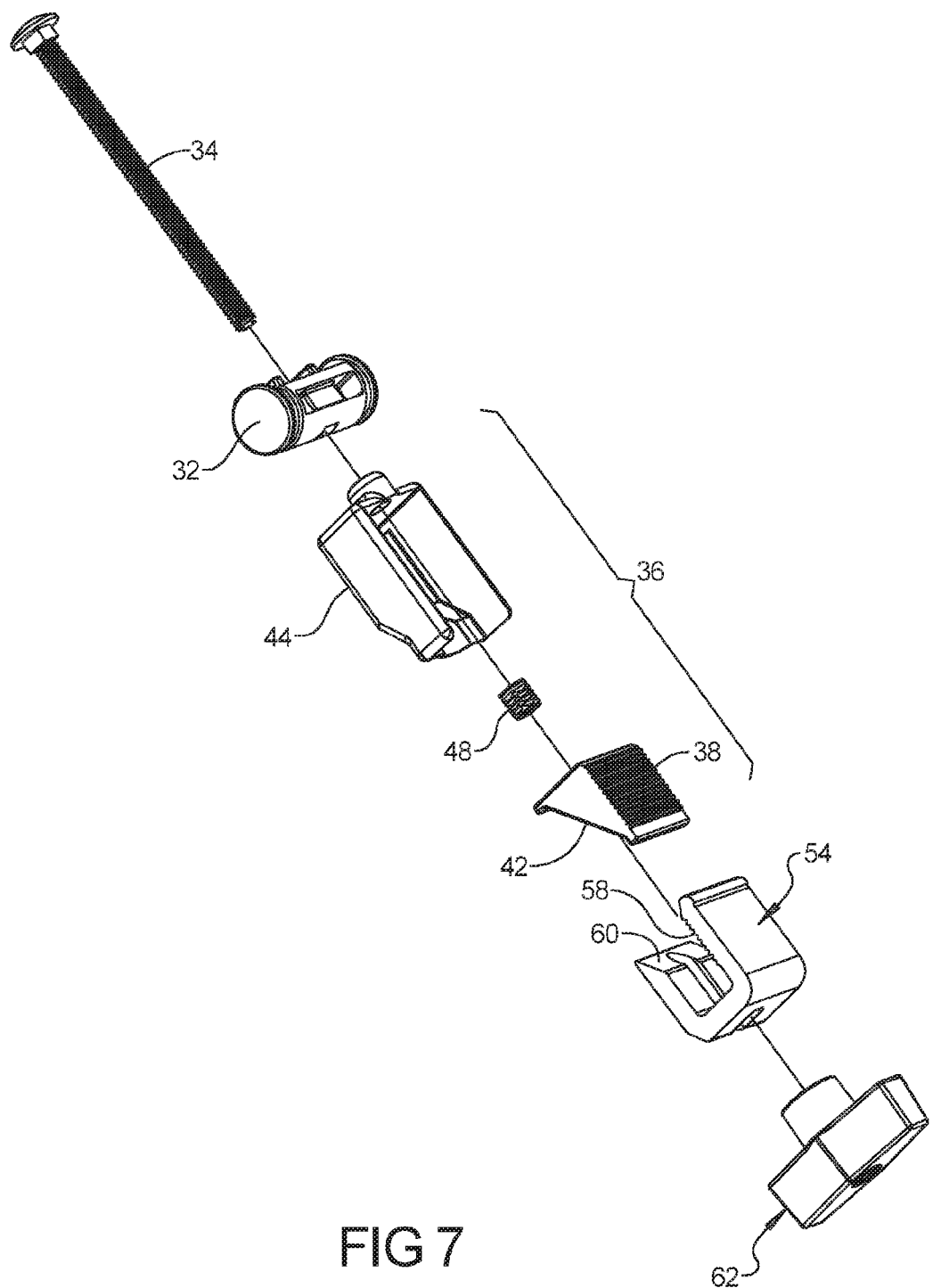
FIG. 7 is an exploded perspective view of the side lock clamp of FIG. 2.
Figure 8:
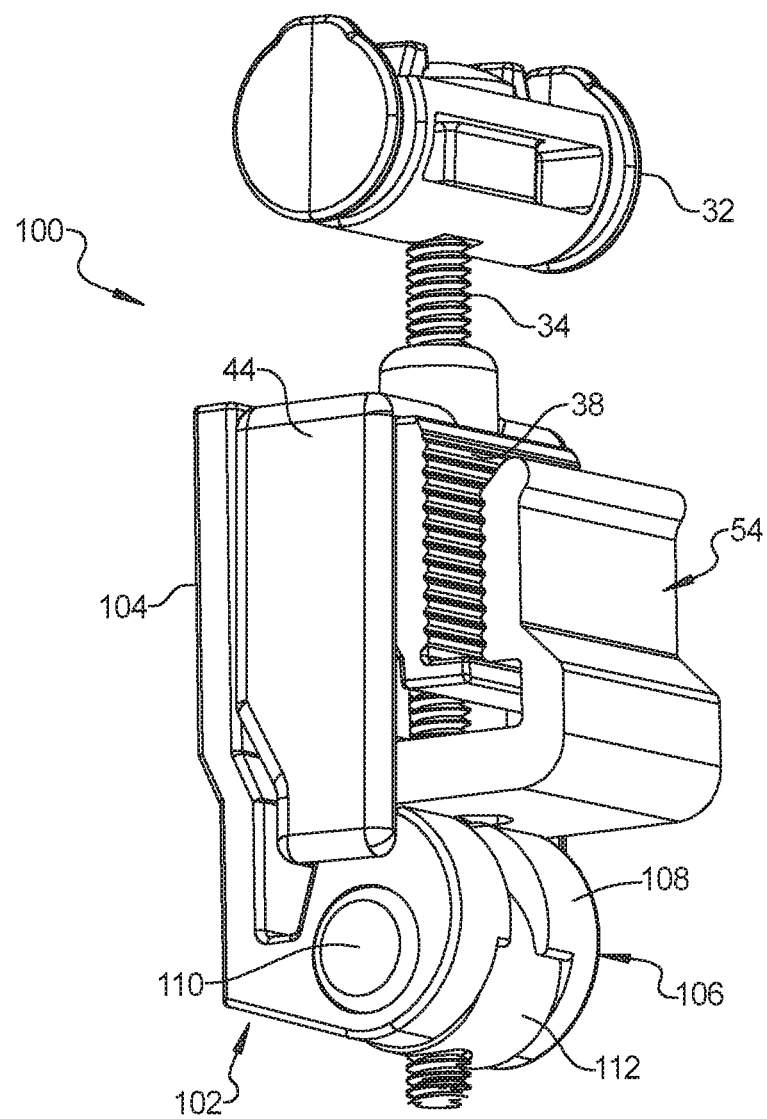
FIG. 8 is a perspective view of a side lock clamp in a second embodiment of the present disclosure.
Figure 9:
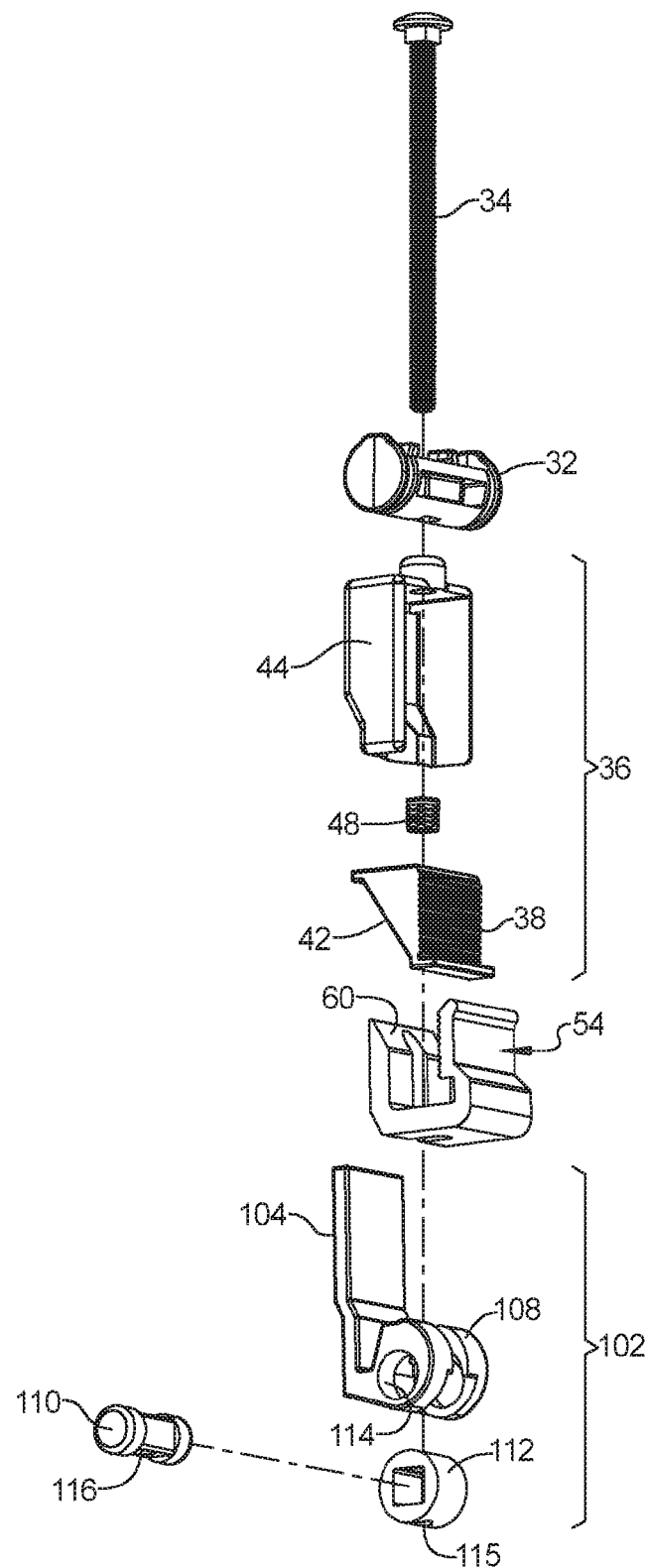
FIG. 9 is an exploded perspective view of the side lock clamp of FIG. 8.
Figure 10:
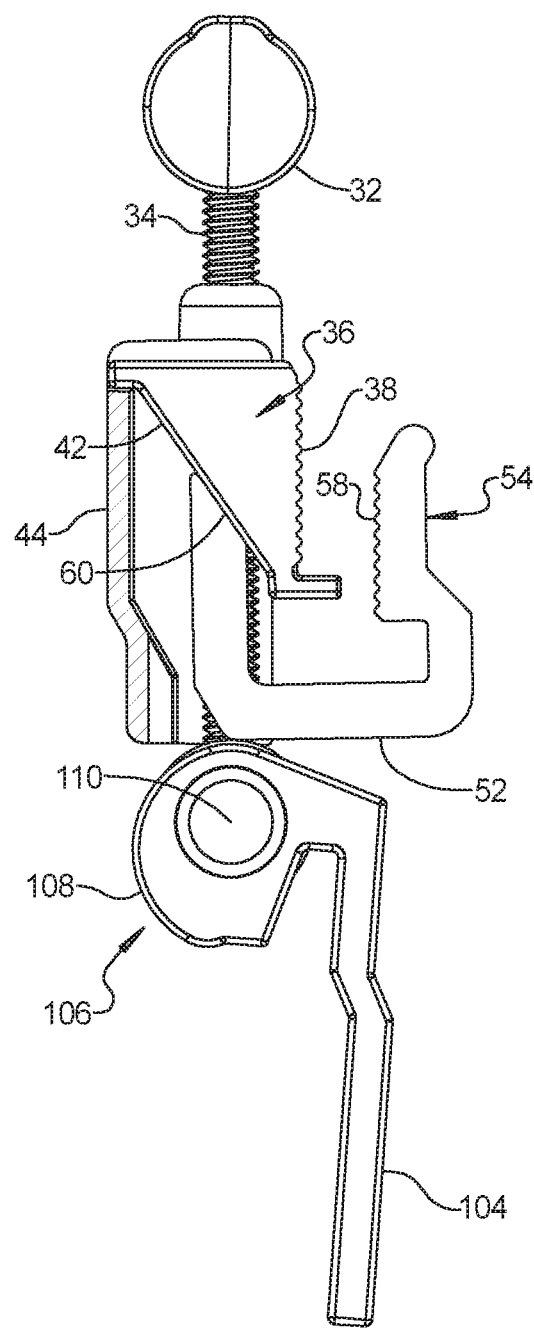
FIG. 10 is a partial cross-sectional view of the side lock clamp of FIG. 8 in the unlocked state.
Figure 11:
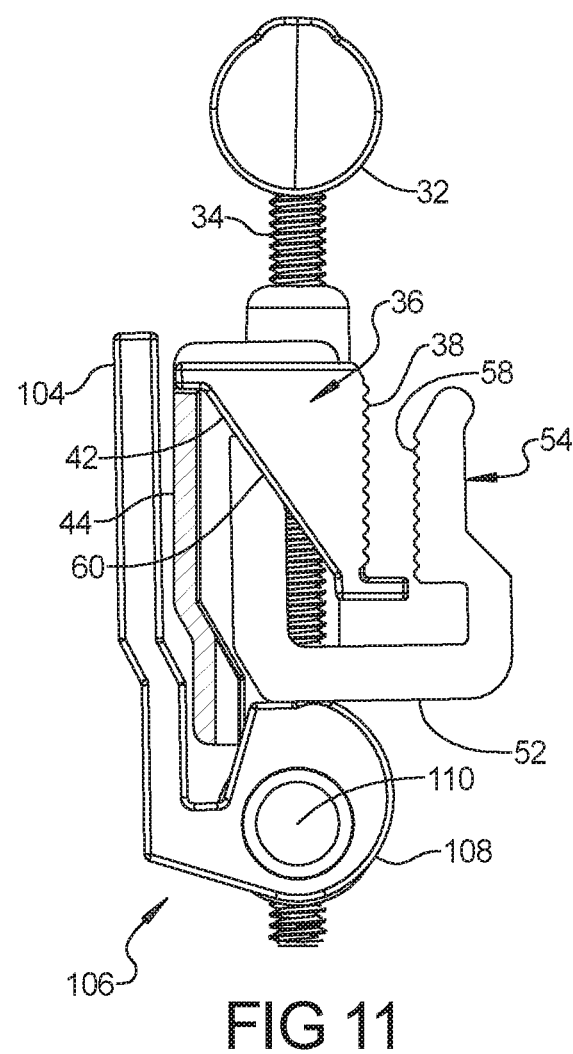
FIG. 11 is a partial cross-sectional view of the side lock clamp of FIG. 8 in the locked state.
Figure 12:
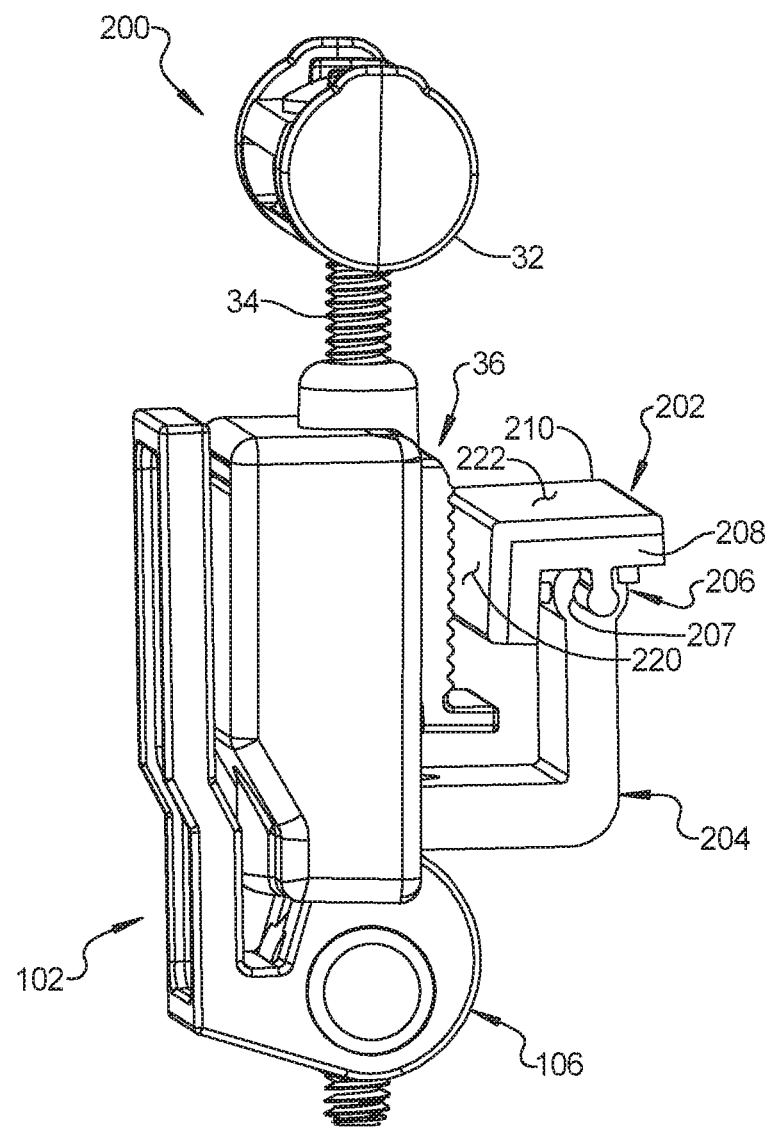
FIG. 12 is a perspective view of a side lock clamp having a distal member in a third embodiment of the present disclosure.
Figure 13:
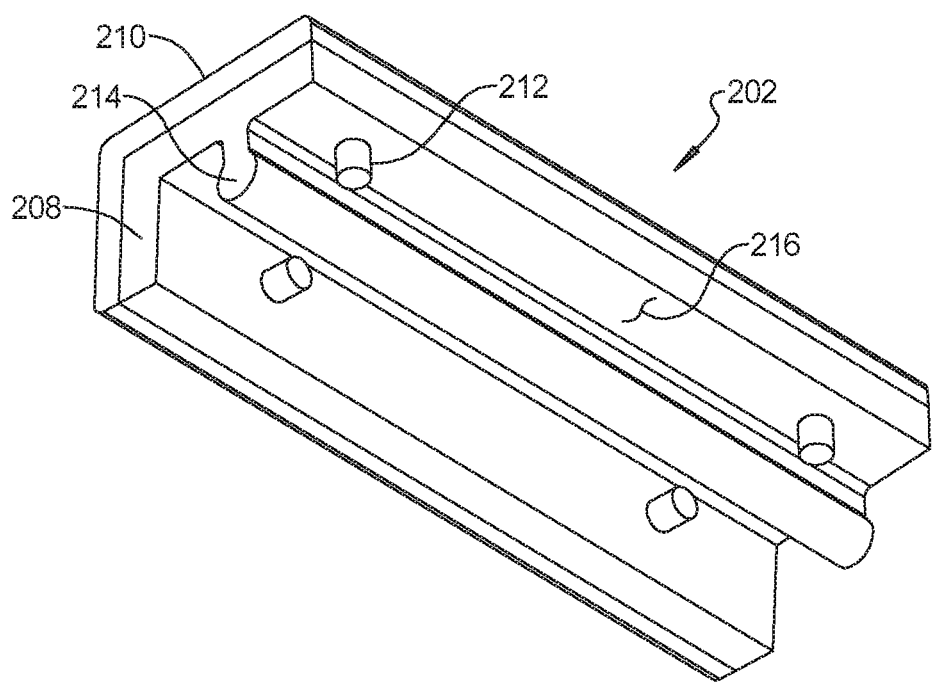
FIG. 13 is a perspective view of the distal member of FIG. 12.
Figure 14:
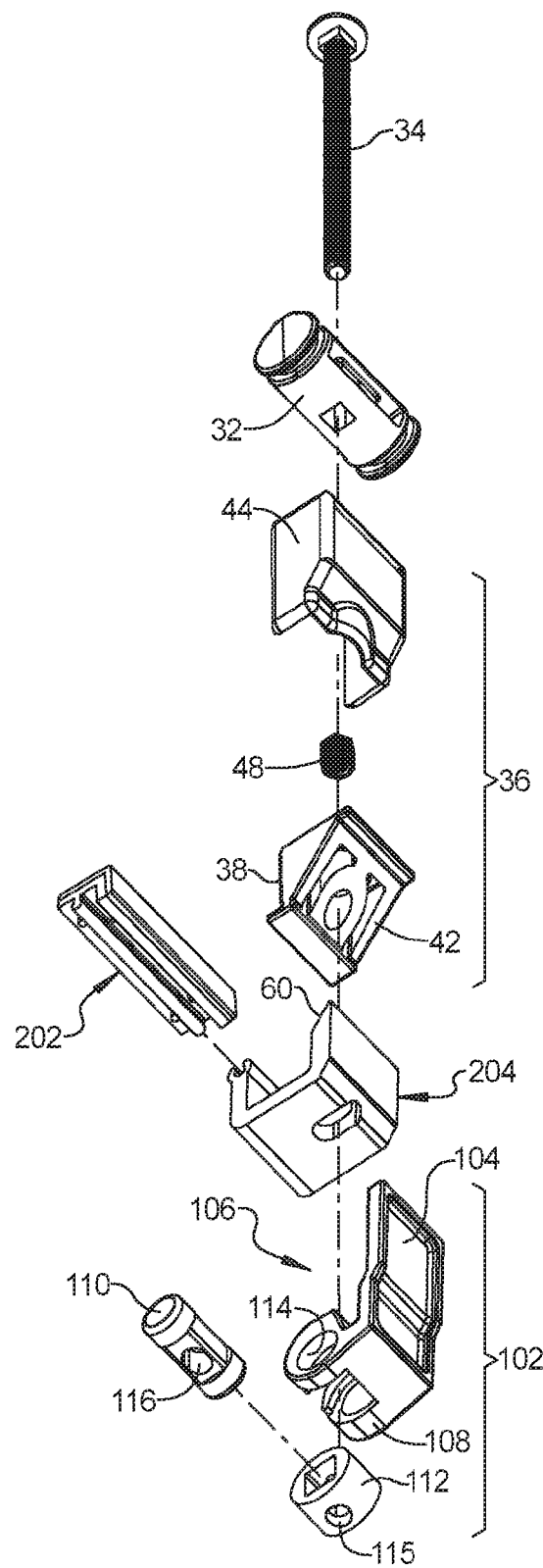
FIG. 14 is an exploded perspective view of the side lock clamp of FIG. 12.

Referring to FIGS. 2 and 3, this embodiment of the clamp 26 is illustrated in a clamped position similar to FIG. 4C. As illustrated, the first clamping surface 38 of the first clamp member 36 engages the inboard side 24 of the flange 20 and the second clamping surface 58 of the second clamp member 54 engages the outboard side 22 of the flange 20 to apply a compressive clamping force to the flange 20. As illustrated, both the first and second clamping surfaces, 38 and 58, directly engage against the opposing sides or faces, 24 and 22, respectively, of the flange 20. In other embodiments, one or both of the first and second clamping surfaces, 38 and 58, can indirectly engage the opposing sides or faces, 24 and 22, respectively, of the flange 20. For example, another component of the tonneau cover system 10, such as a plastic cover material, can overlay one or both sides of the flange 20.

In some embodiments, the clamping surfaces, 38 and 58, can have a rectangular or other shape that has both a longitudinally (generally vertically) extending dimension and a laterally (generally horizontally) extending dimension that is sufficient to reinforce the flange 20 and eliminate or minimize permanent deformation of the flange 20 under the loads transmitted by the clamp 26 from the tonneau cover to the flange 20 during normal vehicle operation. For example, even if the clamp 26 ultimately engaged the distal end 50 of the flange 20 and applied a meaningful upwardly directed force thereto, the reinforcing effect of the clamping surfaces, 38 and 58, could eliminate or minimize such permanent deformation of the flange 20.

In some cases, the clamp 26 can be coupled to a rail of the foremost tonneau section 12. For example, the rail(s) 31 to which a side lock clamp 26 is coupled can include a header and cross-rail of such a foremost tonneau section 12. Other positions are possible in other cases. For example, the clamp 26 can be coupled to a side rail and to rail members of an intermediate or aft-most tonneau cover section 12.

In the example embodiment of FIGS. 1-7, the clamp 26 includes the manually rotatable wing nut 62 to engage the second clamp member 54 and cause the axial movement of the second clamp member 54 along the rod 34. The clamp can alternatively or additionally include a manually rotatable cam lock member of the present disclosure. More particularly, with reference to FIGS. 8-11, the tonneau cover system can include a side lock clamp 100 that includes a manually operable cam lock member or cam lever lock 102. Similar to the clamp 26, the clamp 100 can also include the barrel member 32, the rod 34, the first clamp member 36 having the first ramp surface 42, and the second clamp member 54 having the second ramp surface 60.

The cam lock member 102 can be positioned along the rod 34, and can be manually operable to place the clamp 100 in a locked state or an unlocked state. The cam lock member 102 can include an arm or a lever portion 104 and a cam portion 106. The lever portion 104 can be rotatable about the cam portion 106 in a first direction (e.g., clockwise in FIG. 10) to place the cam lock member 102 in a locked state and in a second direction opposite the first direction (e.g., counter-clockwise in FIG. 11) to place the cam lock member 102 in an unlocked state. In the example embodiment, with the cam lock member 102 in the locked state, the lever 104 can be positioned adjacent to and substantially parallel with the housing 44. With the cam lock member 102 in the unlocked state, the lever 104 can be positioned on the side of the base 52 opposite to the second clamp member 54 and away from the housing 44.

The cam portion 106 can include an oblong portion 108, a pin 110, and a bearing 112. The oblong portion 108 can have an oblong or oval like cross-section and a core opening 114 defined off-set from a center of the oblong portion 108. The oblong portion 108 can be configured to engage with the second clamp member 54 such that the second clamp member 54 rests or is in contact with an outer surface of the oblong portion 108.

The pin 110 can be positioned within the core opening 114 of the oblong portion 108 and can have an opening 116. The pin 110 and the core opening 114 can be positioned coaxially with each other and can be offset from a center of the oblong portion 108. The bearing 112 can be positioned between the pin 110 and the oblong portion 108, and can have an opening 115. The rod 34 can extend through the opening 116 of the pin 110 and the opening 115 of the bearing 112. The pin 110 and the bearing 112 can secure the cam lock member 102 to the rod 34. For example, in one example, the bearing 112 and/or pin 110 can have threads, such that the cam lock member 102 can be rotated along the rod 34 to abut with the second clamp member 54 when the second clamp member 54 is in an unclamped state. The lever 104 can then be rotated to have the cam portion 106 push the second clamp member 54 to the clamped state. In another example, the pin 110 can be configured to have threads and include a spring for engaging and disengaging the threads of the pin 110 with the rod 34. In particular, the pin 110 can be compressed to one side to have the spring release the threads away from the rod 34. With the pin 110 compressed, the cam lock member 102 can be moved along the rod 34 in a sliding manner. Once positioned, the pin 110 can be released to have the spring provide a biasing force against the pin 110 so that the threads of the pin 110 engage with the rod 34. It should be understood that other configurations and/or methods can be used to secure the cam lock member 102 to the rod 34.

In operation, as the lever portion 104 rotates, the cam portion 106 can translate the rotational movement to lateral movement to move the second clamp member 54 along the rod 34. Specifically, in the unlocked state, the lever portion 104 and the pin 110 can be positioned substantially adjacent to the base 52 of the second clamp member 54 (see FIG. 10). As the lever portion 104 rotates from the unlocked state to the locked state, the oblong portion 108 can rotate and push the second clamp member 54, which can be engaged with the oblong portion 108, toward the barrel 32 or the frame 31 of the cargo box 11. The pin 110 and the lever portion 104 can move away from the base 52 such that the pin 110 can move laterally away from the second clamp member 54 and the lever portion 104 can move toward the housing 44.

In response to this axial movement, the second ramp surface 60 of the second clamp member 54 can move in a similar motion relative to the first ramp surface 42 as discussed above. In particular, the second ramp surface 60 can move along the first ramp surface 42 of the first clamp member 36 which can cause translation of the second clamp member 54 relative to and toward the first clamp member 36 and in a direction that is perpendicular to the axis A (FIG. 4B). With the lever portion 104 moving from the unlocked state to the locked state, the second clamp member 54 can move from an unclamped position to a clamped position relative to the first clamp member 36. Accordingly, the cam lock member 102 can cause the second clamp member 54 to move toward the tonneau cover as the cam lock member 102 moves from the unlocked state to the locked state. With the cam lock member 102 in the locked state (see FIG. 11), the second clamp member 54 and the first clamp member 36 can be maintained in the clamped stated with the cam lock member 102 applying a force onto the second clamp member 54.

As the lever portion 104 rotates from the locked state to the unlocked state, the oblong portion 108 can rotate and release the second clamp member 54 such that the second clamp member 54 can move away from the first clamping surface 38. The pin 110 and the lever portion 104 can move toward the base 52 such that the pin 110 and the lever 104 can be positioned closer to the second clamp member 54 in the unlocked state than in the locked state.

When the second clamp member 54 is released, the second ramp surface 60 can move along the first ramp surface 42 in a similar manner as discussed above. Specifically, the second ramp surface 60 can move along the first ramp surface 42 which can cause translation of the second clamp member 54 relative to and away from the first clamp member 36. Accordingly, the cam lock member can cause the second clamp member 54 to move away from the tonneau cover as the cam lock member moves from the locked state to the unlocked state. With the cam lock member 102 in the unlocked state, the second clamp member 54 and the first clamp member 36 can be in the unclamped state.

In the example embodiments, the clamps 26 and 100 can each be configured to apply a clamping force to the flange by way of the first clamp member 36 and the second clamp member 54. Specifically, the first clamping surface 38 of the first clamp member 36 can engage the inboard side 24 of the flange 20 and the second clamping surface 58 of the second clamp member 54 can engage the outboard side 22 of the flange 20 to apply a compressive clamping force to the flange 20. To protect the flange 20 of the cargo box from deformation from loads transmitted during normal vehicle operation, the side lock clamp can include a distal member that has a flexible member for engaging with the flange 20 as the second clamping surface. In addition, the clamp can be designed to also engage the underside of the ledge for locating the lateral clamping force in a region of the flange adjacent the ledge and optionally also applying a clamping force in a vertical direction between the clamp body and a portion of the cover overlying the ledge.

More particularly, with reference to FIGS. 12-15, a side lock clamp 200 can include a clamping head or distal member 202 positioned on a distal end 206 of a second clamp member 204. In particular, the distal end 206 of the second clamp member 54 can define a groove or a channel 207 that is attached to the distal member 202. The side lock clamp 200 can also include the barrel member 32, the rod 34, the first clamp member 36, and the cam lock member 102. In the example embodiment, the second clamp member 204 can include similar features as the second clamp member 54 and, thus, for the purpose of brevity, only the differences between the second clamp member 54 and 204 are described.

The distal member 202 can include a rigid member 208 and an elastic, a resilient or a flexible member 210 disposed on the surface of the rigid member 208. In the example embodiment, the flexible member 210 can be attached to the rigid member 208 by way of retention members 212 that extend through the rigid member 208. Alternatively, the flexible member 210 may be formed or molded directly on to the rigid member 208.

The distal member 202 can also include a rail member 214 extending along an underside 216 of the distal member 202. The rail member 214 of the distal member 202 can engage with the groove 207 of the second clamp member 204 to secure the distal member 202 to the second clamp member 204. In addition, the retention members 212 can also retain the distal member 202 to the distal end 206 of the second clamp member 204. In the example embodiment, the distal member 202 having the flexible member 210 is provided as a separate component attached to the second clamp member 204. Alternatively, the distal member can be formed directly on to the distal end of the second clamp member and, thus, eliminate the rigid member 208 and the rail member 214. For example, a flexible member having a tubular shape can be molded on the distal end and into the groove of the second clamp member. It should be apparent that the distal member is integrated with the second clamp member such that the distal member and the second clamp member move together.

Figure 15:
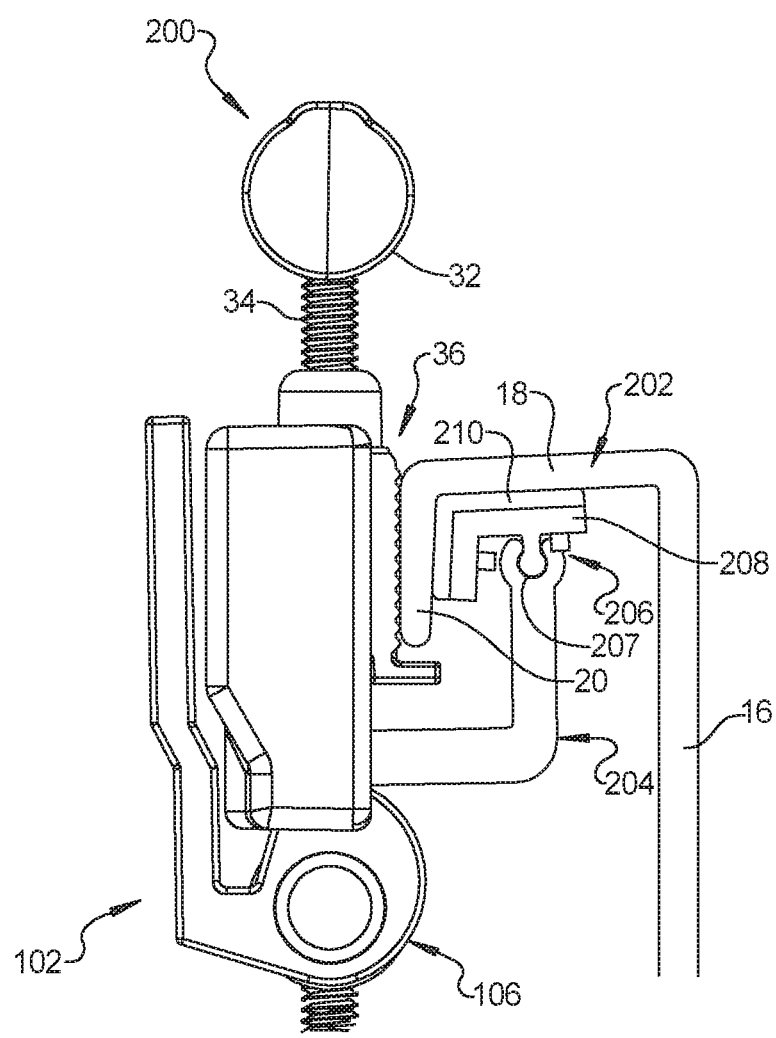
FIG. 15 is a side plan view of one exemplary embodiment of a side lock clamp of the tonneau cover system of FIG. 12 in a clamped position, with a partial cross-sectional view of a cargo box.

The flexible member 210 can have an outboard side clamping surface 220 that can engage with the outboard side 22 of the flange 20 when the clamp 200 is in the clamped state. Accordingly, in operation, the outboard side clamping surface 220, as the second clamping surface, can apply a compressive clamp force in conjunction with the first clamping surface 38 to the flange 20, which is positioned between the first clamp member 36 and the second clamp member 54. In addition to or in lieu of the outboard side clamping surface 220, the flexible member 210 can have an interior side clamping surface 222 that can engage with an underside of the ledge 18 when the clamp 200 is in the clamped state, thereby locating the clamping force to an upper region of the flange 20 adjacent the ledge 18 (FIG. 15). Moreover, in the clamped state, with the second clamp member 204 extending between the flange 20 and the outer wall 16 of the cargo box 11, the interior side clamping surface 222 of the distal member 202 can engage with the underside of the ledge 18 to provide a clamping force thereto. The rail member 214 of distal member 202 can be pivotally coupled to the distal end of second clamp member 204 and can swivel to facilitate seating of clamping surfaces 220 and 222 as the surfaces 220 and 222 slide into place against the flange 20 and ledge 18.

In the example embodiment, the side lock clamp 200 can include the cam lock member 102. Alternatively, a side lock clamp having the distal member 202 can include the threaded connector 62.

Example embodiments are provided so that this disclosure will be thorough and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having" are inclusive and, therefore, specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Features or elements that are "integral" or "integrated" together include both instances where they are initially formed as portions of a single piece component, and instances where they are initially formed as portions of multiple separate components that are subsequently coupled together into a single unit.

Although the terms first, second, third, etc., may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A tonneau cover system for a cargo box of a pickup truck, the cargo box comprising a frame, the tonneau cover system comprising:
   a tonneau cover for covering the cargo box, and
   a clamp to secure the tonneau cover to the frame, the clamp comprising:
   a first clamp member coupled to the tonneau cover and having a first clamping surface;
   a second clamp member coupled to the tonneau cover and having a second clamping surface, the second clamp member being moveable relative to the first clamp member between an unclamped position and a clamped position;
   a ramp mechanism including at least one ramp surface between the first and second clamp members shaped to cause lateral translation of the second clamping surface toward the first clamping surface in response to movement of the second clamp member toward the tonneau cover as the clamp moves from the unclamped position to the clamped position; and
   a cam lock member positioned to engage with the second clamp member and including a lever for placing the cam lock member in a locked state or an unlocked state, wherein the cam lock member causes the second clamp member to move toward the tonneau cover as the cam lock member moves from the unlocked state to the locked state and causes the second clamp member to move away from the tonneau cover as the cam lock member moves from the locked state to the unlocked state.

2. The tonneau cover system according to claim 1, wherein the clamp further comprises a rod upon which the first clamp member, the second clamp member, and the cam lock member are mounted.

3. The tonneau cover system according to claim 2, wherein the second clamp member and the cam lock member are slidably mounted on the rod, and the cam lock member slidingly moves the second clamp member along the rod as the lever rotates to place the cam lock member in the locked state or the unlocked state.

4. The tonneau cover system according to claim 1, wherein the cam lock member further comprises a cam attached to the lever, wherein the cam engages with the second clamp member to slidingly move the second clamp member as the lever rotates to place the cam lock member in the locked state or the unlocked state.

5. The tonneau cover system according to claim 1, wherein, when in the clamped position, the first clamping surface of the first clamp member is in opposed relationship to the second clamping surface to apply a clamping force therebetween.

6. The tonneau cover system according to claim 1, wherein the second clamping member is in the clamped position when the cam lock member is in the locked state.

7. The tonneau cover system according to claim 1, wherein the second clamping surface moves toward the first clamping surface by way of the ramp mechanism as the lever rotates to place the cam lock member in the locked state and the second clamping surface moves away from the first clamping surface by way of the ramp mechanism as the lever rotates to place the cam lock member in the unlocked state.

8. The tonneau cover system according to claim 1, wherein the cam lock member further comprises a cam that is attached to the lever to translate a rotational movement of the lever to a lateral movement for moving the second clamp member.

9. The tonneau cover system according to claim 1, wherein the first and second clamp members are mounted on a rod defining an axis, and wherein a first of the at least one ramp surface extends at an acute angle relative to the axis and is integral with the first clamp member.

10. The tonneau cover system according to claim 9, wherein a second of the at least one ramp surface extends at a complementary angle to the acute angle and is integral with the second clamp member.

11. The tonneau cover system according to claim 1, wherein, when in the clamped position, the first and second clamping surfaces are positioned to apply a clamping force to the frame throughout an area defined by overlapping opposing contacting portions of the first and second clamping surfaces, with the area having dimensions that are large enough to reinforce the frame sufficiently to avoid permanent deformation of the frame under loads transmitted by the clamp to the frame during normal vehicle operation.

12. The tonneau cover system according to claim 1, wherein the second clamp member includes a distal member positioned at a distal end of the second clamp member, wherein the distal member has a flexible surface that forms the second clamping surface of the second clamp member.

13. The tonneau cover system according to claim 1, wherein the second clamp member includes a distal member positioned at a distal end of the second clamp member, and wherein the frame comprises a sidewall having a ledge and a flange depending from the ledge, and wherein the distal member includes a side clamping surface for engaging the flange opposite the first clamp member for applying a clamping force therebetween and an upper clamping surface for engaging an underside of the ledge.

14. The tonneau cover system according to claim 13, wherein the tonneau cover extends over the ledge, and wherein the upper clamping surface is adapted for applying a clamping force to the underside of the ledge opposite the tonneau cover.

15. The tonneau cover system according to claim 13, wherein the distal member is pivotally mounted to the distal end of the second clamp member.

\* \* \* \* \*